(12) United States Patent
Ziemkowski

(10) Patent No.: US 7,046,292 B2
(45) Date of Patent: May 16, 2006

(54) SYSTEM FOR NEAR-SIMULTANEOUS CAPTURE OF MULTIPLE CAMERA IMAGES

(75) Inventor: Ted Ziemkowski, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 696 days.

(21) Appl. No.: 10/050,741

(22) Filed: Jan. 16, 2002

(65) Prior Publication Data

US 2003/0133018 A1    Jul. 17, 2003

(51) Int. Cl.
*H04N 5/222* (2006.01)
(52) U.S. Cl. .................... 348/371; 348/207.99
(58) Field of Classification Search ............ 348/211.2, 348/371, 47, 48, 159, 211.3, 211.11, 296, 348/362, 370, 367, 139, 153, 262
See application file for complete search history.

(56) References Cited

U.S. PATENT DOCUMENTS

| 5,721,971 | A  | * | 2/1998  | Sasaki .......................... 396/56 |
| 5,777,667 | A  | * | 7/1998  | Miyake et al. ................. 348/64 |
| 6,262,767 | B1 | * | 7/2001  | Wakui .................... 348/211.99 |
| 6,411,780 | B1 | * | 6/2002  | Maruyama .................... 396/59 |
| 2002/0163577 | A1 | * | 11/2002 | Myers ......................... 348/152 |

* cited by examiner

*Primary Examiner*—Tuan Ho

(57) ABSTRACT

A system for synchronizing the exposure of an image by a master camera with the exposure of an image by one or more slave cameras, each of which is located at a different position relative to a common subject to be photographed. Exposure synchronization is accomplished via an optical sensing system on each slave camera that detects a light pulse (e.g., a flash or strobe) from the master camera emitted simultaneously with the initiation of the exposure of the subject, causing the slave camera to trigger an exposure of the subject, if the detected light pulse is within the parameters of the image capture mode manually selected for a given camera. An image may thus be captured from each of the different angles, relative to the subject being photographed, at which the cameras are positioned.

18 Claims, 5 Drawing Sheets

SYSTEM FOR NEAR-SIMULTANEOUS CAPTURE OF MULTIPLE CAMERA IMAGES

FIELD OF THE INVENTION

The present invention relates generally to cameras and photography systems, and more particularly, to a system for photographing an event simultaneously using multiple cameras.

BACKGROUND OF THE INVENTION

Statement of the Problem

It is a problem to photograph a single event from multiple angles simultaneously using a plurality of cameras. Previously, an event could be photographed by a single camera using multiple slave flash triggers, each of which is connected to a separate flash unit. However, there was, heretofore, no simple method for synchronizing a plurality of cameras to essentially simultaneously photograph a single event from multiple perspectives, angles, or locations.

Solution to the Problem

The present system solves the above problem and achieves an advance in the field by synchronizing the capture of an image of a target subject by a master camera with the capture of an image of the subject by one or more slave cameras, each of which is located at a different position relative to the subject to be photographed.

Initially, a light pulse is transmitted by a 'master' camera when the camera's shutter button is pressed. Image capture (exposure) synchronization of the slave cameras is accomplished via an optical sensing system on each slave camera that detects a light pulse (e.g., a flash or strobe) transmitted from the master camera which causes the slave camera's electronic 'shutter' to trigger and record an image present on the camera's CCD (the 'charge-coupled device' that detects the image) if the detected light pulse is within certain parameters. These parameters may be manually selected for each camera to establish an appropriate image capture mode for a particular situation. An image may thus be captured from each of the different angles, relative to the subject being photographed, at which the cameras are positioned.

Any one of several image capture modes may be selected by a user of the present system. These modes include the detection of light pulses in the infrared, ultraviolet, and visible spectrum, as well as light pulses having a predetermined strobe pulse sequence or other characteristics. Slave cameras may also be triggered by light pulses emitted from other cameras (such as conventional film cameras) or flash units that emit any basic type of flash or strobe.

The slave mode camera system disclosed herein is useful for capturing sporting events as well as social events such as birthday parties, weddings, and the like. The system may also be used for security monitoring and photographic recording of any event of potential interest, where it is advantageous to capture the event from multiple camera angles. In addition, the use of multiple camera angles can provide useful information in applications such as failure analysis of structures and in other types of testing environments.

The present system also takes advantage of technology available in many existing digital cameras, requiring only the addition of software or firmware that functions in accordance with the method described herein.

DETAILED DESCRIPTION

Figure 1A:
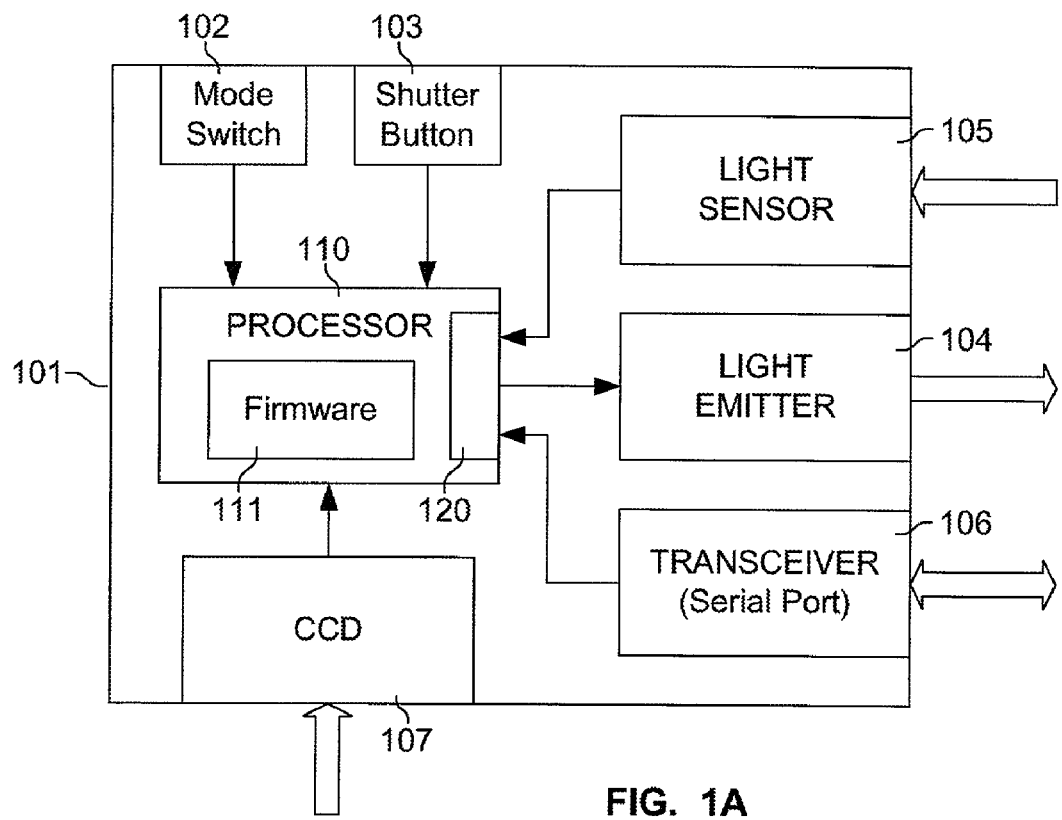
FIG. 1A illustrates components of interest in a digital camera programmed in accordance with the present system.

FIG. 1A illustrates components of interest in a digital camera 101 programmed in accordance with the present system. As shown in FIG. 1, camera 101 comprises one or more light receiving devices including light sensor 105, infrared serial port transceiver 106, and CCD 107, which is the charge-coupled device that detects the image to be photographed. Camera 101 further comprises one or more light transmitting devices including light emitter 104 and infrared serial port transceiver 106. Each of the light receiving devices 105/106/107 and each of the light transmitting devices 104/106 is coupled to processor 110. Processor 110 is also coupled to shutter button 103 and image capture mode switch 102, the function of which is described in detail below. Although three light receiving devices 105/106/107 and two light transmitting devices 104/106 are shown in FIG. 1, the present system is operable with any one of the light receiving devices and any one of the light receiving devices shown therein. Note that the term 'exposure' is used herein to denote the process of image capture by a digital camera, notwithstanding the fact that a digital camera does not use photographic film.

Figure 1B:
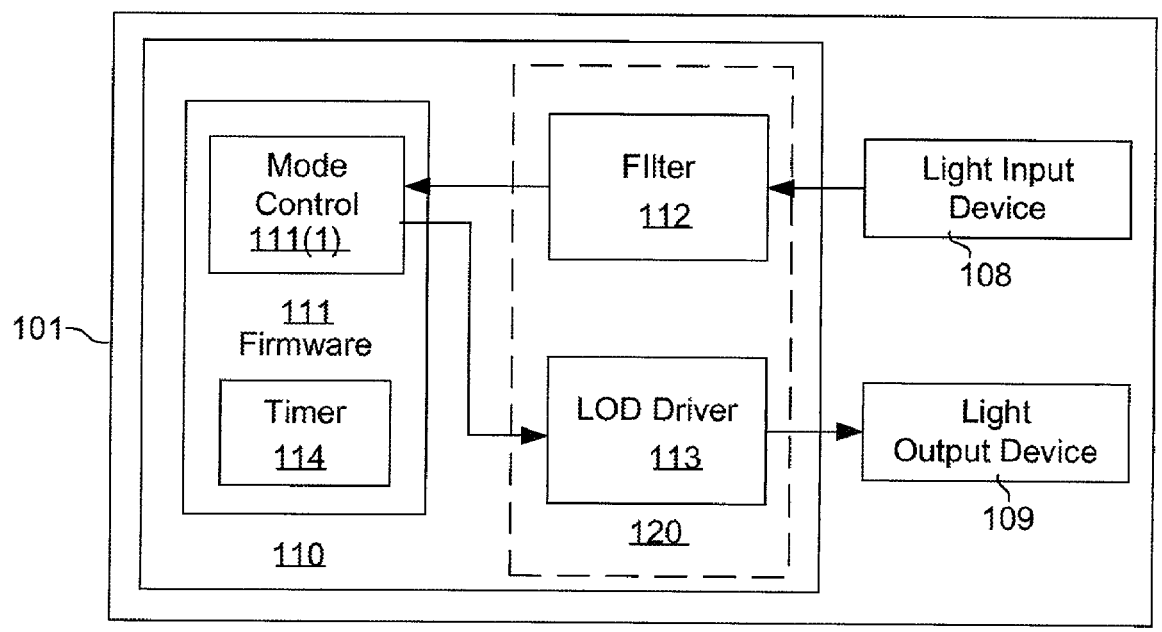
FIG. 1B illustrates, in further detail, certain aspects of processor 110.

FIG. 1B illustrates, in further detail, certain aspects of an exemplary processor 110. As shown in FIG. 1B, processor 110 provides a mode control function 111(1) and a timer 114. I/O interface block 120 in FIG. 1B includes a light input filter/decoder 112 and light output device driver 113. Block 120 is shown in dotted lines as the I/O interface may be physically integrated with processor 110, or functions provided by the interface may be performed by the processor in lieu of separate hardware devices. The functions provided by mode control unit 111(1), filter/decoder 112, driver 113, and timer 114 (as explained below) may be optionally implemented by software, firmware, or hardware. In any event, the functions performed by blocks 110 and 120 are initiated in response to commands from processor 110. Light receiving devices 105/106/107 are represented generically by light input (or optical input) device 108, since only one of the devices 105/106/107 is required for operation of the present system. Light emitting devices 104 and 106 are likewise represented generically by light output device 109, as only one of the devices 104/106 is required for system operation.

In an exemplary embodiment of the present system, light output device 109 is a typical camera strobe light, and light input device 108 is the camera's CCD 107, since this device detects the wavelength of light emitted by a typical camera strobe. In an alternative embodiment, light input device 108 may be an infrared light sensor 105 which responds to infrared light emitted by an infrared light output device 104 such as an IR transistor, an IR diode, an IRDA module, or the like.

The present system typically operates with a normal camera flash unit (strobe light) functioning as light emitter 104. The type of strobe (light pulse) emitted by a normal flash unit typically has a pulse duration between approximately 250 microseconds and 4 milliseconds, and comprises light in the visible spectrum between approximately 450 and 700 nanometers. In an alternative embodiment, the strobe may emit light in the infrared or ultraviolet spectral region. The present system may be programmed via image capture mode switch (or other input device) 102 for operation with many possible strobe types, as well as programmed to ignore potentially false trigger pulses such as pre-flashes used for red-eye reduction and exposure testing. In addition, a slave camera 101 may be set to a mode wherein it triggers the capture of an image (i.e., an exposure) only in response to receiving a light pulse from another camera having a specific strobe characteristic such as a predefined strobe pulse sequence and/or a specific wavelength. Other types of strobes 104 might include infrared (IR), and ultraviolet (UV) for specialized photography.

Figure 2:
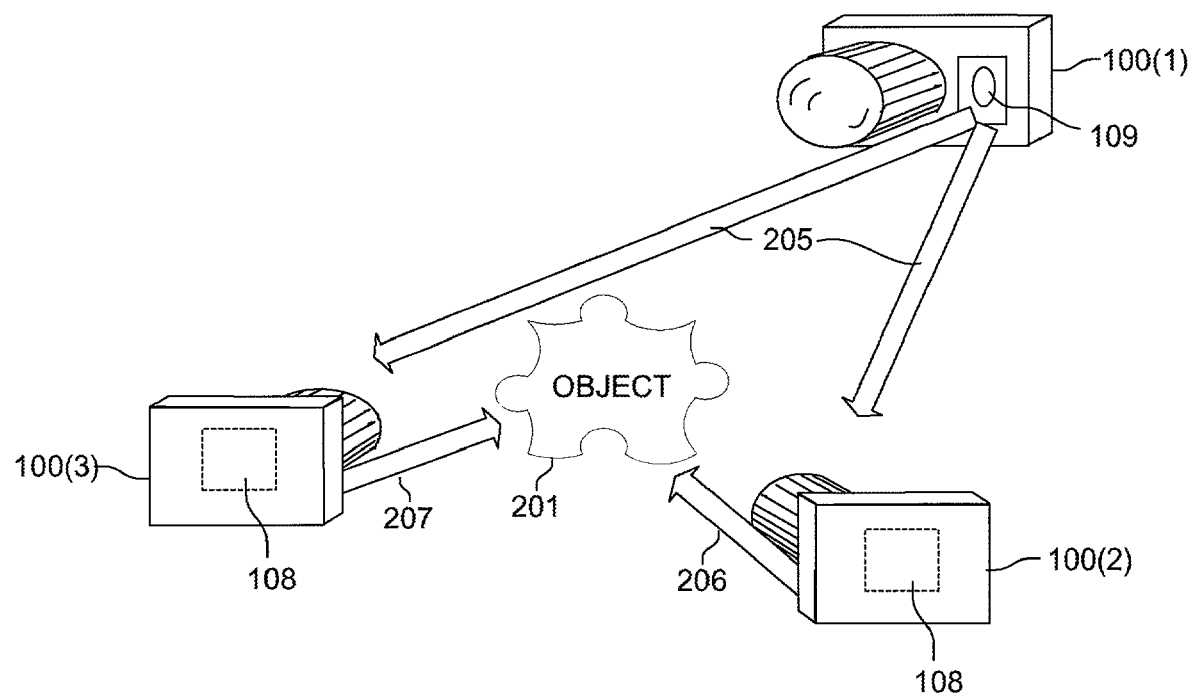
FIG. 2 is a diagram showing an exemplary arrangement of a master camera and two slave cameras.

FIG. 2 is a diagram showing an exemplary arrangement of a master camera and two slave cameras in accordance with the present system. As shown in FIG. 2, master camera 101(1) and one or more slave cameras 101(2) and 101(3) are positioned so that all of the cameras are pointed at a target subject 201. Each of the cameras is positioned at a different location to provide a corresponding different viewing angle of the target subject 201.

Figure 5:
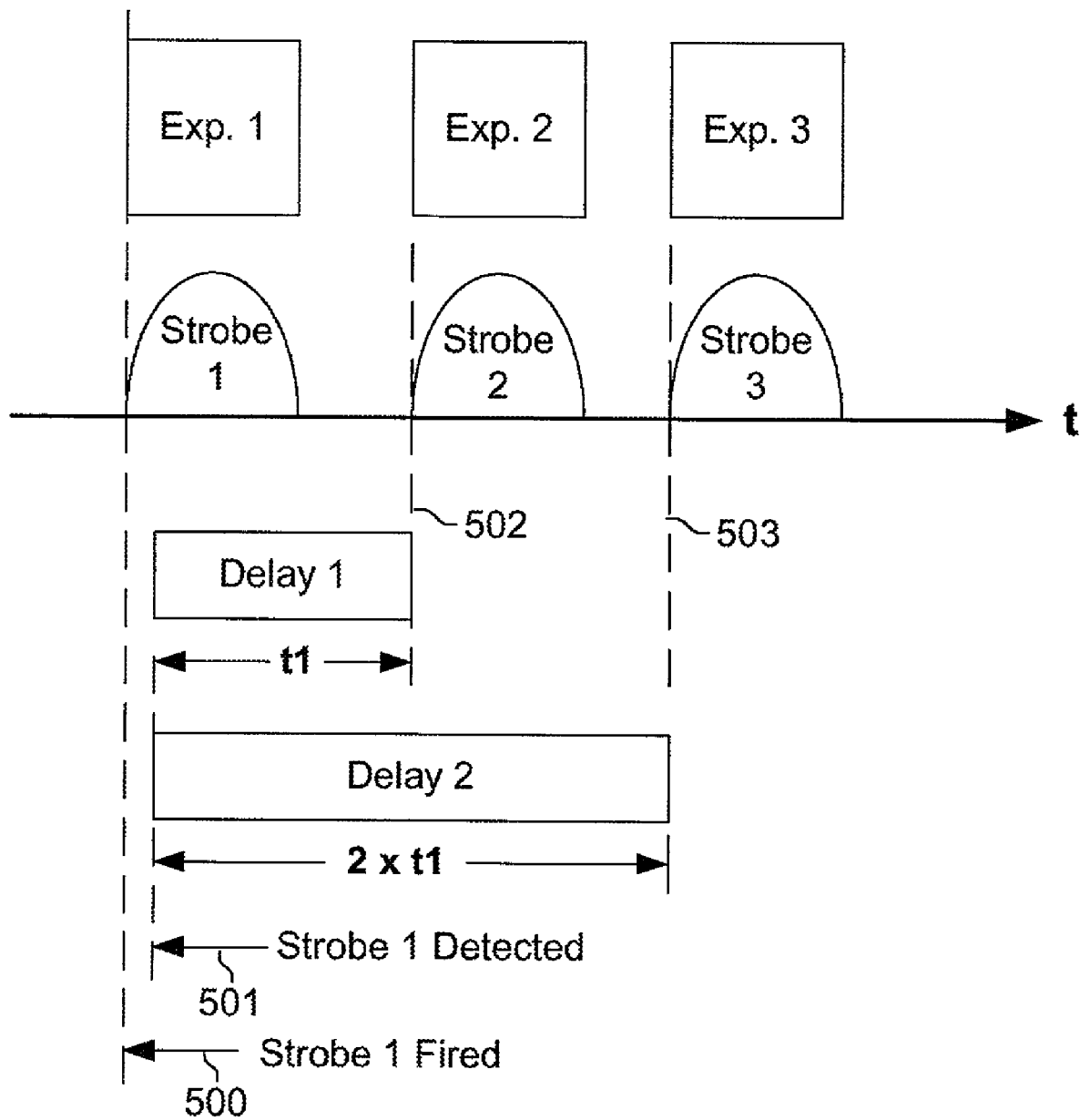
FIG. 5 is a diagram showing the timing relationships between strobes and image capture in a multiple camera scenario.

FIG. 5 is a diagram showing the timing relationships between strobes and image capture in a multiple camera scenario. Operation of the present system is best understood by viewing FIG. 2 and FIG. 5 in conjunction with one another.

In operation, when shutter button 103 on master camera 101(1) is pressed (at reference number/mark 500 in FIG. 5), the camera 101(1) starts the exposure (image capture) Exp. 1 of the target subject 201, and the camera's light output device 109 emits a light pulse 205 (FIG. 2) which is detected (at mark 501) by a light input device 108 on each slave camera 101(2) and 101(3). Slave camera 101(2) then starts a timer 114 with a delay t1 (Delay 1) sufficient to avoid 'seeing' the light pulse (strobe) 205 from master camera, e.g., 10 milliseconds. Delay t1 is at least equal to, or preferably, slightly greater than (by approximately 15 to 25 percent) the length of time it takes for a typical light pulse 205 to decay to a level of zero or near-zero luminosity where it will not adversely affect the exposure of the slave camera. When the timer has expired (at mark 502), slave camera 101(2) triggers its strobe 206 and starts the exposure Exp. 2 of the target subject 201. When light pulse 205 is detected (at mark 501) by slave camera 101(3), it starts a timer 114 with a delay equal to t1+t1(2×t1), since this camera 101(3) must wait until the light pulse 206 from the strobe of slave camera 101(2) has decayed. In the general case, the nth slave camera in a given system will have a timer delay of n×t, where t is a value slightly greater than the duration of the light pulse being employed.

Slave camera 101(3) ignores strobe 206 from camera 101(2), and at mark 503, the timer for slave camera 101(3) expires, and camera 101(3) then triggers its strobe 207 and starts the exposure (Exp. 3) of the target subject 201. An image of target subject 201 is thus captured in near simultaneity from each of the different angles, relative to the subject, at which the cameras 101(1)–101(3) are positioned.

Figure 3:
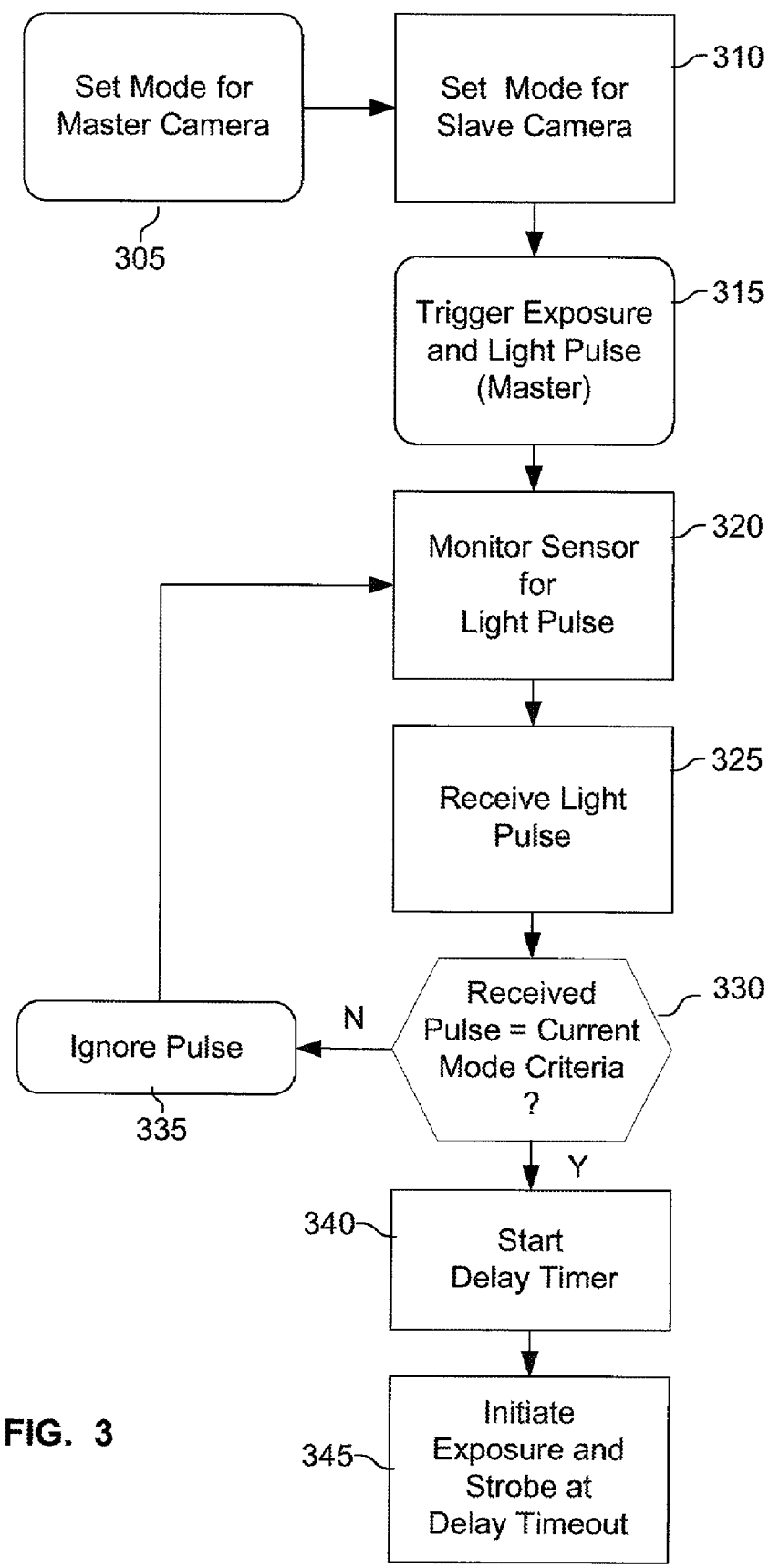
FIG. 3 is a flowchart illustrating an exemplary set of steps performed by a slave camera in effecting the present system.

FIG. 3 is a flowchart illustrating an exemplary set of steps performed by a slave camera in carrying out a method in accordance with the present system. As shown in FIG. 3, at step 305, a user sets the image capture mode for master camera 101(1) using mode switch 102. At step 305, the image capture mode setting is input to mode control software or firmware to establish a number of manually selected parameters for a given camera for a particular situation. Any one, or a combination of these parameters may be selected to cause a camera 101 to initiate an exposure only when a received light pulse has characteristics that correspond with each of the parameters associated with a selected image capture mode. These parameters include:

(a) the master or slave status of the camera;
(b) for slave cameras, the slave's 'firing' order, i.e., whether this particular slave is the second, third, etc., camera to trigger a strobe/exposure;
(c) the light output device 108 to be triggered;
(d) the light input device 109 (if camera is a slave, or in the case of a master camera, where the camera is to be triggered remotely)
(e) the strobe pulse coding sequence (if a predefined strobe pulse sequence is one of the parameters for a specific mode);
(f) a specific wavelength range (if light pulses having a particular type of spectral characteristic are to be ignored); and
(g) whether image capture by a camera in master camera mode is to be triggered by shutter button 103 or by an external strobe.

The above parameters are pre-established in mode control unit 111(1) via software, firmware, or hardware, prior to use of camera 101. The image capture mode settings selected at a given time on each camera in the present system must correspond to one another; i.e., a corresponding slave camera must have a light input device 108 that is capable of detecting the wavelength and coding sequence, if any, of the strobe emitted by the master camera.

For a given image capture mode, light output driver 113 may be used to implement a predefined strobe pulse coding sequence for a master or slave camera, and also to select the appropriate light output device. Filter/decoder 112 may be used, correspondingly, to detect a predefined strobe pulse coding sequence for a slave camera. IRDA serial port transceiver 106 may be used to facilitate the light pulse coding and communication between a master camera and one or more slave cameras. Filter/decoder 112 may also be used to signal processor 110 that an appropriate strobe has been detected by filtering out a predetermined range of wavelengths in accordance with a particular image capture mode to avoid unwanted triggering of a camera due to receiving strobes or light pulses from extraneous sources.

Mode (f), above, may be implemented whereby a slave camera fires when any other basic type of strobe is detected. Therefore, a conventional film camera with a typical flash unit can be employed as a master camera in the present system.

At step 310, a user sets the image capture mode for a slave camera (101(2), for example) using mode switch 102. The image capture mode setting is then input to mode control software or firmware 111(1) to establish the appropriate parameters, for the selected mode, for timer 114, filter/decoder 112, and light output driver 113. At step 315, master camera 101(1) starts the exposure and triggers the light pulse in accordance with the selected mode.

All remaining steps in FIG. 3 are performed by each of the slave cameras. At step 320, the slave camera firmware 111 monitors the input from light input device 108, as filtered and decoded by filter/decoder 112 (if filtering and/or decoding is necessary in accordance with the selected mode parameters). At step 325, a light pulse reaches the camera, and at step 330, firmware 111 determines whether the received pulse is within the parameters established for the selected mode, assuming that filter/decoder 112 has sent a signal, indicative of the type of light pulse, to firmware 111 in processor 110. If no such signal is generated by filter/decoder 112, or if firmware 111 determines that the signal received from filter 112 does not fall within the present image capture mode parameters, then the received light pulse is ignored, at step 335, and monitoring continues at step 320.

At step 340, delay timer 114 is started, as described above with respect to FIG. 5. Finally, at step 350, when timer 114 times out, an exposure and a strobe are initiated by the slave camera.

Figure 4:
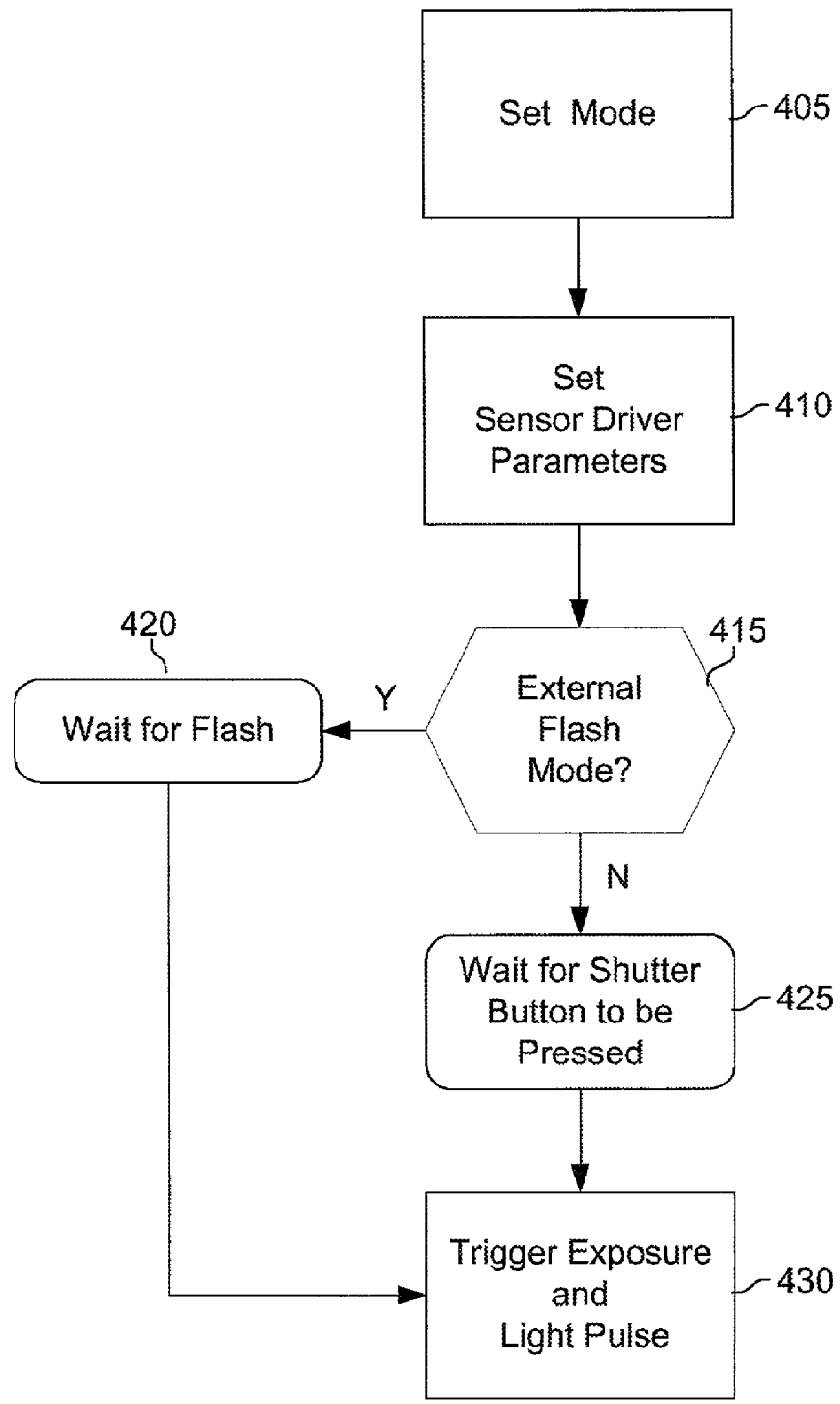
FIG. 4 is a flowchart illustrating an exemplary set of steps performed by a master camera.

FIG. 4 is a flowchart illustrating an exemplary set of steps performed by a master camera 110(1). As shown in FIG. 4, at step 405, the image capture mode is selected by a user. At step 410, the mode setting is then input to mode control software or firmware 111(1) to establish the appropriate parameters, for the selected mode, for filter/decoder 112 and light output driver 113. At step 415, if the selected mode indicates that an exposure is to be triggered by an external strobe instead of shutter button 103, then firmware 111 waits either for the strobe to be received at step 420, or for the shutter button to be pressed at step 425. Upon the detection of either the shutter button being pressed, or receipt of an external strobe (according to the selected mode), at step 430, an exposure is initiated and the selected type of strobe is triggered via light output device driver 113 and the appropriate light output device 109.

It should be noted that the present system is operational with any number of slave cameras, and furthermore, that there is not necessarily any functional distinction between a camera used as a master camera and a camera used as a slave camera, other than the image capture mode in which a given camera may be operating at a specific time.

While exemplary embodiments of the present invention have been shown in the drawings and described above, it will be apparent to one skilled in the art that various embodiments of the present invention are possible. For example, the specific sequence of steps described above in FIGS. 3 and 4, as well as the particular configuration of components shown in FIGS. 1A and 1B, should not be construed as limited to the specific embodiments described herein. Modification may be made to these and other specific elements of the invention without departing from its spirit and scope as expressed in the following claims.

What is claimed is:

1. A digital camera comprising:
    a light input device for detecting a first light pulse;
    a processor, coupled to the light input device;
    a timer, initiated by the processor in response to receiving a signal therefrom indicative of said first light pulse;
    wherein the processor is programmed to initiate capture of an image in response to an indication from the timer that lapse of a time period essentially equal to the duration of said first light pulse has occurred; and
    a light output device that transmits a second light pulse in synchronism with initiation of said capture of an image, in response to a signal issued from the processor.

2. The camera of claim 1, wherein said time period is slightly greater than the length of time it takes for said first light pulse to decay to a level of zero luminosity.

3. The camera of claim 1, wherein t is a value slightly greater than the length of time it takes for said first light pulse to decay to a level of zero luminosity, and wherein said time period is equal to n X t, where n is an integer representing that said camera is the nth said camera in a multiple-camera system.

4. The camera of claim 1, further including an image capture mode input device for manually selecting one of a plurality of image capture modes, each of which has parameters associated therewith that are used by the processor to determine whether to initiate said capture of an image.

5. The camera of claim 4, wherein said capture of an image is initiated when a detected said light pulse has characteristics that correspond with the parameters associated with a selected one of said image capture modes.

6. The camera of claim 5, further comprising a plurality of optical input devices for detecting said first light pulse including a charge-coupled device and an infrared light sensor, wherein one of said parameters indicates which one of the optical input devices is used as the light input device.

7. The camera of claim 6, wherein one of said plurality of optical input devices is a serial port transceiver for detecting a predefined light pulse coding sequence and indicating to the processor whether the coding sequence corresponds with one of the parameters associated with a selected one of said image capture modes.

8. The camera of claim 5, wherein one of the parameters associated with a given said image capture mode comprises a specific wavelength range for the detected light pulse.

9. The camera of claim 5, wherein one of the parameters associated with a given said image capture mode indicates that said capture of an image is to be triggered by a shutter button instead of said first light pulse.

10. The camera of claim 1, further including a filter, coupled between the light input device and the processor, for signaling the processor that the light pulse detected by the light input device has pre-established spectral characteristics.

11. The camera of claim 1, further including a filter, coupled between the light input device and the processor, for signaling the processor that the light pulse detected by the light input device is not an extraneous event.

12. The camera of claim 1, further including a filter, coupled between the light input device and the processor, for signaling the processor that the light pulse detected by the light input device has characteristics that correspond with the parameters associated with a selected one of said image capture modes.

13. A digital camera comprising:
    a plurality of light input devices, each of which is capable of detecting a first light pulse;
    a processor, coupled to each one of the plurality of light input devices;
    a timer, initiated by the processor in response to receiving a signal therefrom indicative of said first light pulse;
    wherein the processor is programmed to initiate exposure of an image in response to an indication from the timer that lapse of a time period essentially equal to the duration of said first light pulse has occurred;
    an image capture mode input device for manually selecting one of a plurality of image capture modes, each of which has parameters associated therewith that are used by the processor to determine whether to initiate said exposure;
    wherein one of said parameters indicates which one of the plurality of light input devices is used for detecting said first light pulse; and a light output device that transmits a second light pulse in synchronism with initiation of said exposure, in response to a signal issued from the processor.

14. The digital camera of claim 13, wherein said exposure is initiated when a detected said light pulse has characteristics that correspond with the parameters associated with a selected one of said image capture modes.

15. The camera of claim 13, further including a filter, coupled between the light input device and the processor, for signaling the processor that the light pulse detected by the light input device has pre-established spectral characteristics.

16. A system for synchronizing a first exposure of a subject by a first camera with a second exposure of the subject by a second camera, the system comprising the steps of:
    simultaneously initiating the first exposure and transmitting a light pulse from the first camera; and
    initiating the second exposure immediately after a length of time slightly greater than the time it takes for said light pulse to decay to a level of zero luminosity after receipt of the light pulse by the second camera; whereby the subject is photographed from two different viewing angles.

17. The system of claim 16, further including a third camera, and further comprising the steps of:
    transmitting a secondary light pulse from the second camera in response to receiving the light pulse from the first camera; and
    initiating, by the third camera, a third exposure in response to receiving the light pulse from the second camera.

18. The system of claim 16, further including the step of manually selecting one of a plurality of image capture modes, each of which has parameters associated therewith that indicate whether to initiate said second exposure, wherein said second exposure is initiated when a detected said light pulse has characteristics that correspond with the parameters associated with a selected one of said image capture modes.

* * * * *